United States Patent [19]
Taki et al.

[11] Patent Number: 5,220,712
[45] Date of Patent: Jun. 22, 1993

[54] SNAP TOOTH LOCK DEVICE WITH QUICK UNLOCK MECHANISM

[75] Inventors: Naoya Taki; Osamu Ogasawara, both of Osaka, Japan

[73] Assignee: Matsushita Electric Industrial Co., Ltd., Osaka, Japan

[21] Appl. No.: 789,824

[22] Filed: Nov. 8, 1991

[30] Foreign Application Priority Data

Nov. 9, 1990 [JP] Japan .................................. 2-305120

[51] Int. Cl.5 ...................... A44B 17/00; F16B 21/00
[52] U.S. Cl. ........................................ 24/614; 24/662; 24/704.1; 403/322; 292/83
[58] Field of Search ................ 24/614, 615, 604, 662, 24/683, 704.1; 403/18, 322, 327; 292/83, 86

[56] References Cited

U.S. PATENT DOCUMENTS 2,610,875  9/1952  Wheelden .......................... 403/322
2,896,277  7/1959  Halligan ............................... 292/83
3,522,963  8/1970  Farnden ............................... 292/83

FOREIGN PATENT DOCUMENTS 3346243  7/1985  Fed. Rep. of Germany ........ 24/683
2121094  12/1983  United Kingdom .
2121097  12/1983  United Kingdom .
2162239  1/1986  United Kingdom .
2193995  2/1988  United Kingdom .

Primary Examiner—Victor N. Sakran
Attorney, Agent, or Firm—Pollock, VandeSande & Priddy

[57] ABSTRACT

A component with an unlock mechanism is unlockably locked with respect to another component by a resilient snap tooth engaging in a hole defined in the other component. To unlock the components from each other, the unlock mechanism is pulled between the components to force the snap tooth out of the hole against its resiliency. The unlock mechanism has a slant surface that slides against a slant surface of the snap tooth to displace the snap tooth out of the hole in response to the movement of the unlock mechanism.

12 Claims, 3 Drawing Sheets

SNAP TOOTH LOCK DEVICE WITH QUICK UNLOCK MECHANISM

BACKGROUND OF THE INVENTION

1. Field of the Invention

The present invention relates to a device for locking a component on another component with a snap locking tooth, the device having a mechanism for unlocking the components quickly from each other.

2. Description of the Prior Art

Various components need to be locked on other components, but should be unlocked therefrom when desired. Lock devices used to unlockably lock two components are required to be low in cost, simple in operation, and free of undue stresses. To meet such requirements, one known lock device for detachably locking two components to each other comprises a resilient snap tooth on one of the components. When the components are to be locked on each other, the component with the resilient snap tooth is moved toward the other component until the resilient snap tooth snaps into a hole defined in the other component. Once the resilient snap tooth enters the hole, the resilient snap tooth is engaged by an edge of the hole, keeping the components locked.

To unlock the components from each other, the resilient snap tooth is pried out of the hole with a tool by the user, and, at the same time, the component with the resilient snap tooth is pulled away from the other component. Since the tool is manually inserted from outside the other component into the hole, difficulty is sometimes experienced in smoothly getting the resilient snap tooth out of the hole depending on the position and orientation of the hole. It has often been necessary to reposition or reorient the components so that the hole and hence the resilient snap tooth can easily be accessed by the tool. However, repositioning or reorienting the components may not be easy especially when they are heavy and/or bulky.

SUMMARY OF THE INVENTION

In view of the aforesaid drawbacks of the conventional snap tooth lock device, it is an object of the present invention to provide a snap tooth lock device which allows locked components to be unlocked easily and quickly without repositioning or reorienting the components and also without the need for a tool.

According to the present invention, there is provided a lock device comprising a first component having a hole defined therein, a second component having a snap tooth resiliently engageable in the hole to lock the first and second components with respect to each other, and an unlock mechanism interposed between the first and second components and movable with respect to the first and second components, for displacing the snap tooth out of the hole thereby to unlock the first and second components from each other.

According to the present invention, there is also provided a lock device comprising a first component having a hole defined therein, an unlock mechanism movably disposed on the first component and having a cavity defined therein, and a second component having a snap tooth resiliently engageable in the hole through the cavity to lock the first and second components with respect to each other, the unlock mechanism being movably mounted on the second component, the snap tooth having a first slant surface, the unlock mechanism having a second slant surface at an edge of the cavity for sliding engagement with the first slant surface. The snap tooth is displaceable out of the hole by sliding engagement between the first and second slant surfaces in response to movement of the unlock mechanism with respect to the first and second components.

To unlock the first and second components from each other, the unlock mechanism is simply pulled between the first and second components by the user until the snap tooth is forced out of the hole against its own resiliency. Therefore, the snap tooth can be retracted out of the hole without the need for any special tool which would otherwise be required to pry the snap tooth out of the hole. Inasmuch as no special tool is required, it is not necessary for the user to reposition or reorient the locked components, which may be quite heavy and/or bulky, for easier access to the hole and the snap tooth.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
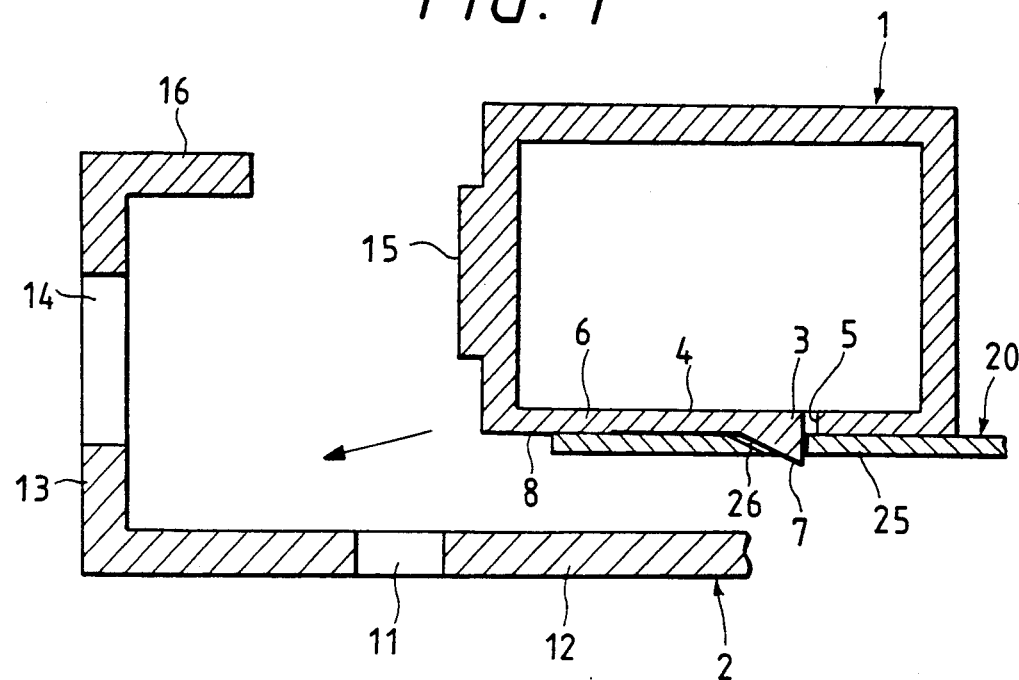
FIG. 1 is a cross-sectional view of components to be locked together by a snap tooth lock device according to the present invention.

FIG. 1 shows two components 1, 2 that are to be unlockably locked together by a lock device according to the present invention. Typically, the component 1 is of a hollow box shape, while the other component 2 is in the form of a receptacle for partly receiving the component 1 therein.

Figure 2:
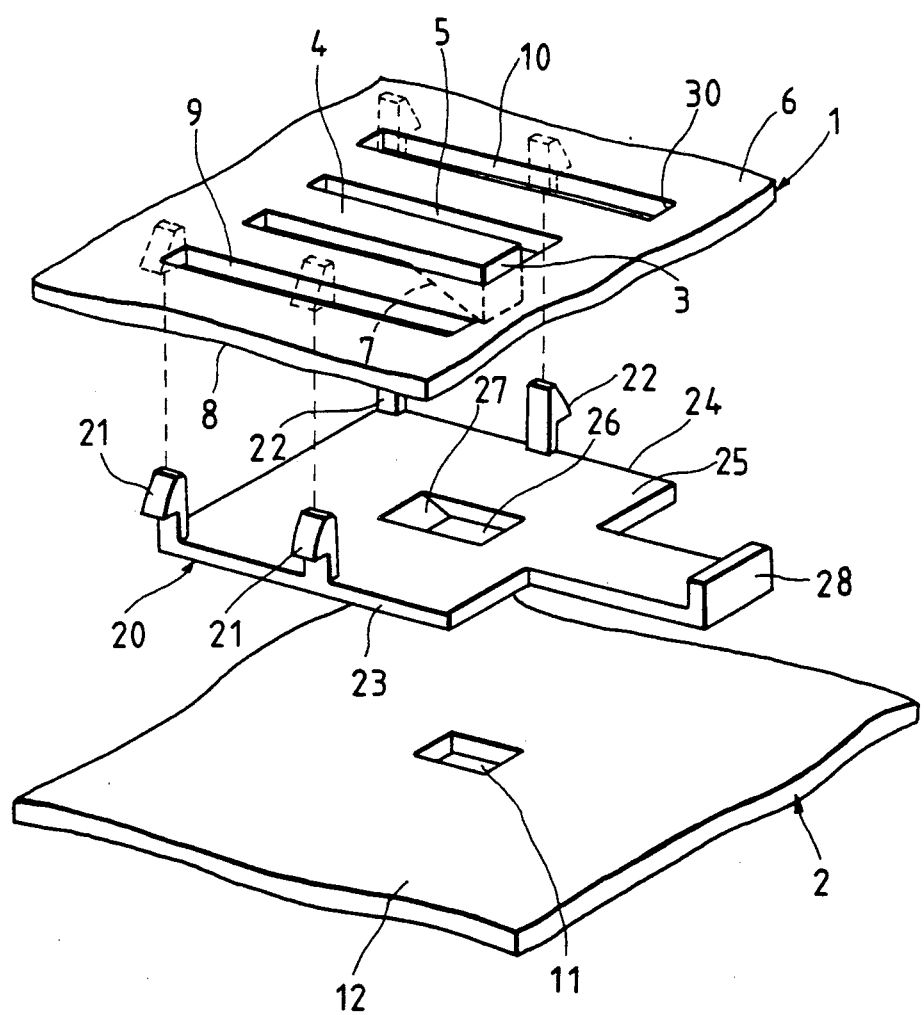
FIG. 2 is an enlarged exploded perspective view of the snap tooth lock device.

As shown in FIGS. 1 and 2, the component 1 has a snap tooth 3 on the distal end of a resilient cantilevered arm 4 positioned in an elongated rectangular recess 5 defined in a side wall 6 of the component 1. The snap tooth is of a triangular cross section and has a slant surface 7 facing outwardly with respect to the component 1. The slant surface 7 has a portion that extends outwardly beyond the outer surface 8 of the side wall 6. The side wall 6 also has a pair of elongated slots 9, 10 defined therein parallel to each other and disposed one on each side of the recess 5.

The component 2 has a rectangular hole 11 defined in a side wall 12 thereof. As shown in FIG. 1, the component 2 also has another side wall 13 extending perpendicularly from the side wall 12 and having a hole 14 defined therein. The hole 14 serves to receive a projection 15 of the component 1 when the component 1 is held by the component 2. A flange 16 extends perpendicularly from the distal end of the side wall 13 for retaining the component 1 with respect to the component 2.

As shown in FIG. 2, an unlock mechanism 20 is movably disposed between the components 1, 2. The unlock mechanism 20 has two pairs of spaced retainer hooks 21, 22 on opposite side edges 23, 24 of a rectangular plate 25 thereof. The pairs of retainer hooks 21, 22 are inserted into the respective slots 9, 10, so that the unlock mechanism 20 is retained on the side wall 6 of the component 1. The retainer hooks 21, 22 inserted in the slots 9, 10 can move in and along the slots 9, 10. Therefore, the unlock mechanism 20 can slide back and forth along the slots 9, 10. The plate 25 of the unlock mechanism 20 has a rectangular cavity 26 defined substantially centrally therein between the opposite side edges thereof. The rectangular cavity 26 has one side defined by a slant surface 27 that is slidably engageable by the slant surface 7 of the snap tooth 3, as described later on. The unlock mechanism 20 has a pull tab 28 extending from one edge of the plate 25 in a direction parallel to the opposite side edges 23, 24 of the plate 25.

When the components 1, 2 are locked together, the snap tooth 3 extends through the cavity 26 and engages in the hole 11.

The process of locking the component 1 on the component 2 and unlocking the component 1 from the component 2 will be described below with reference to FIGS. 3 through 5.

The component 1 with the unlock mechanism 20 mounted thereon is placed on the side wall 12 of the component 2. At this time, the snap tooth 3 is positioned in the cavity 26 of the unlock mechanism 20. When the component 1 starts being engaged by the flange 16 of the component 2, the snap tooth 3 is resiliently displaced into the component 1 because the tip end of the snap tooth 3 is held against the surface of the side wall 12, as shown in FIG. 3.

Figure 3:
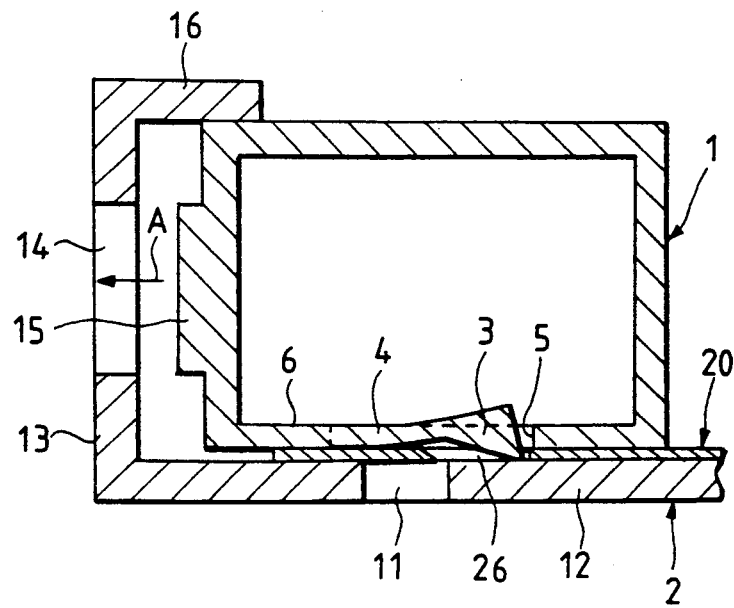
FIG. 3 a cross-sectional view showing the manner in which the components are to be locked together.

The component 1 is moved to the left in the direction indicated by the arrow A in FIG. 3 until the projection 15 fits into the hole 14. Now, the snap tooth 3 disengages from the surface of the side wall 12 and snaps into the hole 11 under its own resiliency, and engages an edge surface 29 of the hole 11, as shown in FIG. 4. The component 1 is now securely locked with respect to the component 2.

To unlock the component 1 from the component 2, the pull tab 28 of the unlock mechanism 20 is pulled by the user in the direction indicated by the arrow B (FIG. 5) so that the unlock mechanism 20 is moved along the slots 9, 10. While the unlock mechanism 20 is being thus moved, the slant surface 27 of the unlock mechanism 20 slides against the slant surface 7 of the snap tooth 3, forcing the snap tooth 3 out of the hole 11. Continued pulling of the pull tab 28 displaces the snap tooth 3 completely out of the hole 11 and also out of the cavity 26, with the arm 4 curved into the component 1 against its own resiliency, as shown in FIG. 5. When the pull tab 28 is further pulled until the leading pair of retainer hooks 21, 22 finally engages ends 30 of the slots 9, 10, the snap tooth 3 is, engaged by the plate 25 out of the cavity 26 and hole 11. Therefore, the component 1 is fully unlocked from the component 2, and can be detached from the component 2.

Figure 4:
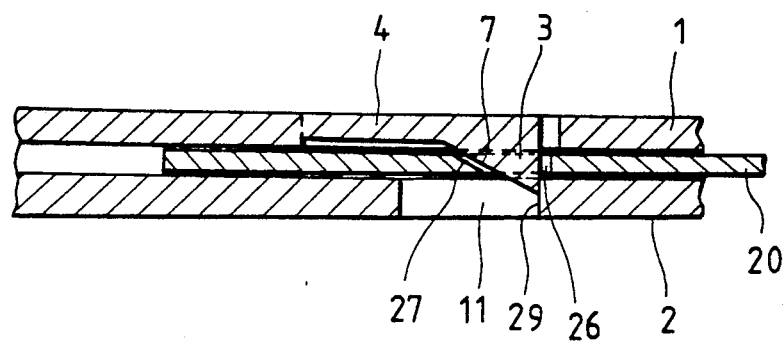
FIG. 4 is an enlarged fragmentary cross-sectional view showing the manner in which the components are locked together.
Figure 5:
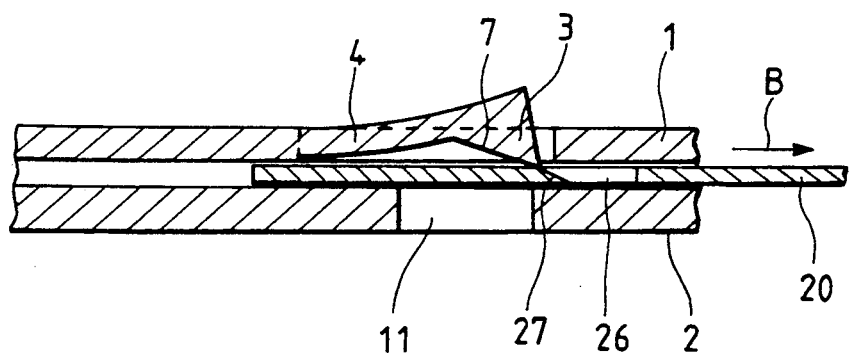
FIG. 5 is an enlarged fragmentary cross-sectional view showing the manner in which the components are to be unlocked from each other.

While the component 1 is being locked with respect to the component 2, the slant surface 7 pushes the slant surface 27 under the resiliency of the arm 4, thereby maintaining the unlock mechanism 20 in the position shown in FIG. 4. Accordingly, the unlock mechanism 20 is prevented from being accidentally displaced to the right in FIG. 4 once the snap tooth 3 engages in the hole 11 through the cavity 26. As a result, after the component 1 is locked with respect to the component 2, the component 1 remains securely locked and cannot be unlocked unless the user intentionally pulls the pull tab 28 manually.

The component 1 can easily be locked with respect to the component 2 when the user pushes the component 1 until the snap tooth 3 snaps into the hole 11. The component 1 can also easily be unlocked from the component 2 when the user pulls the pull tab 28 of the unlock mechanism 20 until the snap tooth 3 is lifted out of the hole 11. The user does not require any special tool that would otherwise be inserted from outside into the hole 11 to displace the snap tooth 3 out of the hole 11, and is not required to reposition or reorient the locked components 1, 2 for easy unlocking operation.

Although a certain preferred embodiment of the present invention has been shown and described in detail, it should be understood that various changes and modifications may be made therein without departing from the scope of the appended claims.

We claim:

1. A lock device comprising:
   a first component having a hole defined therein;
   a second component having a snap tooth resiliently engageable in said hole to lock said first and second components with respect to each other; and
   an unlock mechanism interposed between said first and second components and movable with respect to said first and second components, for displacing said snap tooth out of said hole to thereby unlock said first and second components from each other;
   said unlock mechanism having a plate formed with a cavity defined substantially centrally therein between opposite side edges thereof; and
   said snap tooth extending through said cavity and engaging in said hole when said first and second components are locked together.

2. A lock device according to claim 1, wherein said unlock mechanism is movably mounted on said second component.

3. A lock device according to claim 2, wherein said second component has at least one slot defined therein, and said unlock mechanism has at least one retainer hook movably engaging in said slot, whereby said unlock mechanism is movable along said slot.

4. A lock device according to claim 3, wherein said unlock mechanism has a pull tab extending along said slot.

5. A lock device according to claim 1, wherein said snap tooth has a first slant surface, and said unlock mechanism has a second slant surface which slides against said first slant surface to displace said snap hook out of said hole when said unlock mechanism is moved.

6. A lock device comprising:
   a first component having a hole defined therein;
   a second component having a snap tooth resiliently engageable in said hole to lock said first and second components with respect to each other; and
   an unlock mechanism interposed between said first and second components and movable with respect to said first and second components, for displacing said snap tooth out of said hole to thereby unlock said first and second components from each other;
   said snap tooth having a first slant surface, and said unlock mechanism having a second slant surface which slides against said first slant surface to displace said snap tooth out of said hole when said unlock mechanism is moved; and further said unlock mechanism having a cavity defined therein, said snap tooth being engageable with said hole through said cavity, said second slant surface being positioned at one edge of said cavity.

7. A lock device comprising:

a first component having a hole defined therein;

an unlock mechanism movably disposed on said first component and having a cavity defined therein;

a second component having a snap tooth resiliently engageable in said hole through said cavity to lock said first and second components with respect to each other, said unlock mechanism being movably mounted on said second component; and said snap tooth having a first slant surface, said unlock mechanism having a second slant surface at an edge of said cavity for sliding engagement with said first slant surface, whereby said snap tooth is displaceable out of said hole by sliding engagement between said first and second slant surfaces in response to movement of said unlock mechanism with respect to said first and second components.

8. A lock device according to claim 7, wherein said second component has a pair of spaced slots extending parallel to each other one on each side of said snap tooth, and said unlock mechanism has at least a pair of retainer hooks movably engaging in said slots, respectively, whereby said unlock mechanism is movable along said slots.

9. A lock device according to claim 8, wherein said unlock mechanism comprises a substantially rectangular plate having opposite side edges, said retainer hooks being mounted on said plate at said opposite side edges, respectively, and a pull tab projecting from said plate parallel to said opposite side edges.

10. A lock device according to claim 7, wherein said first component has a flange for retaining said second component thereon with said snap tooth engaging in said hole through said cavity.

11. A lock device comprising:

a first component having a hole defined therein; a second component having a snap tooth resiliently engageable in said hole to lock said first and second components with respect to each other; and an unlock mechanism interposed between said first and second components and movable with respect to said first and second components, said unlock mechanism displacing said snap tooth completely out of said hole by sliding in one direction, thereby unlocking said first and second components from each other.

12. A lock device comprising:

a first component having a hole defined therein;

a second component having a snap tooth resiliently engageable in said hole to lock said first and second components with respect to each other; and an unlock mechanism interposed between said first and second components and movable with respect to said first and second components for displacing said snap tooth out of said hole to unlock said first and second components from each other;

at least either of said snap tooth and said unlock mechanism having a slant surface so as to establish a sliding engagement between the snap tooth and said unlock mechanism to cause said displace movement of the snap tooth, whereby complete disengagement between said snap tooth and said hole opened on the first component is effected by sliding the unlock mechanism in one direction.

* * * * *